US005848358A

United States Patent [19]
Forssén et al.

[11] Patent Number: 5,848,358
[45] Date of Patent: *Dec. 8, 1998

[54] INTRACELL HANDOVER WITH ANTENNA ARRAYS

[75] Inventors: Ulf Forssén, Saltsjö-Boo; Bjorn Gudmundsson, Sollentuna, both of Sweden

[73] Assignee: Telefonaktiebolaget LM Ericsson, Stockholm, Sweden

[*] Notice: The term of this patent shall not extend beyond the expiration date of Pat. No. 5,615,409.

[21] Appl. No.: 741,948

[22] Filed: Oct. 31, 1996

Related U.S. Application Data

[63] Continuation of Ser. No. 264,303, Jun. 23, 1994, abandoned.
[51] Int. Cl.$^6$ ........................................................ H04Q 7/22
[52] U.S. Cl. ........................ 455/437; 455/450; 455/562; 455/62; 370/334
[58] Field of Search .................................. 455/33.2, 33.3, 455/33.4, 54.1, 54.2, 56.1, 62, 63, 34.1, 34.2, 436, 437, 450, 562; 379/59, 60; 370/334

[56] References Cited

U.S. PATENT DOCUMENTS

| | | | |
|---|---|---|---|
| 4,128,740 | 12/1978 | Graziano | 455/562 |
| 5,161,249 | 11/1992 | Meche et al. | 455/562 |
| 5,212,830 | 5/1993 | Miller | 455/562 |
| 5,239,676 | 8/1993 | Strawczynski et al. | 455/62 |
| 5,303,240 | 4/1994 | Borras et al. | 455/562 |
| 5,379,447 | 1/1995 | Bonta | 455/437 |
| 5,428,818 | 6/1995 | Meidan et al. | 455/62 |
| 5,515,378 | 5/1996 | Roy, III et al. | 370/334 |
| 5,603,089 | 2/1997 | Searle et al. | 455/562 |
| 5,615,409 | 3/1997 | Forssen et al. | 455/33.1 |

FOREIGN PATENT DOCUMENTS

| | | |
|---|---|---|
| 616 481 | 9/1994 | European Pat. Off. . |
| WO93/12590 | 6/1993 | WIPO . |
| WO95/02307 | 1/1995 | WIPO . |

OTHER PUBLICATIONS

S. Choi et al., "Adaptive Antenna Array Utilizing the Conjugate Gradient Method for Multipath Mobile Communication", *Signal Processing*, vol. 29, No. 3, Dec. 1992, pp. 319–333.

S. Anderson et al., "An Adaptive Array for Mobile Communication Systems", *IEEE Transactions on Vehicular Technology*, vol. 40. No. 1, Feb. 1991, pp. 230–236.

"Appendix to Request of Spatial Communications, Inc. for a Pioneer's Preference in the Licensing Process for Personal Communication Services", Spatial Communications, Inc., May 4, 1992, pp. 1–46.

S.P. Stapleton et al., "A Cellular Base Station Phased Array Antenna System", *Proceedings of IEEE Vehicular Technology Conference*, 1993, pp. 93–96.

K. Wallstedt et al., "Micro Cellular Performance in a TDMA System", *Proceedings of IEEE Vehicular Technology Conference*, May 1993, pp. 1–4.

H. Eriksson et al., "Multiple Access Options for Cellular Based Personal Communications", *Proceedings of IEEE Vehicular Technology Conference*, May 1993, pp. 1–6.

(List continued on next page.)

*Primary Examiner*—Edward F. Urban
*Attorney, Agent, or Firm*—Burns, Doane, Swecker & Mathis, L.L.P.

[57] ABSTRACT

An intra-cell handover method in a cellular communication system which utilizes spatial information from an antenna array is disclosed. The spatial information is measured with the antenna array. A determination is then made on whether an intra-cell handover is desirable for a mobile station based upon said measured spatial information. The mobile station is then handed over from a first channel to a second channel when desirable and spatial filters in transceivers for mobile stations using the first and second channels are computed based on the spatial information.

21 Claims, 2 Drawing Sheets

OTHER PUBLICATIONS

M. Almgren et al., "Capacity Enhancements in a TDMA System", *Proceedings of IEEE Vechicular Technology Conference*, May 1993, pp. 1–4.

H. Eriksson et al., "Development of Radio Access in Cellular Systems –the Basis of Personal Telephony", *Ericsson Review*, No. 1, 1991, pp.44–50.

J.H. Winters, Optimum Combining in Digital Mobile Radio with Cochannel Interference, *IEEE Transactions on Vehicular Technology*, vol. VT–33, No. 3, Aug. 1984, pp. 144–155.

"Radio Equipment and Systems; Digital European Cordless Telecommunications: A Guide to DECT Features that Influence the Traffic Capacity and the Maintenance of High Radio Link Transmission Quality, Including the Results of Simulations", *European Telecommunications Standards Institute*, ETR 042, Jul. 1992, pp.3–53.

William C.Y. Lee, "Applying the Intelligent Cell Concept to PCS." *IEEE Transaction on Vehicular Technology*, vol. 43, No. 3, Aug. 1994, pp. 672–679.

Ogawa et al., "Spatial Domain Path Diversity Using an Adaptive Array For Mobile Communications", Apr., 1995 pp. 600–604.

Anderson et al., An Adaptive Array For Mobile Communication Systems, Apr., 1991 pp. 230–236.

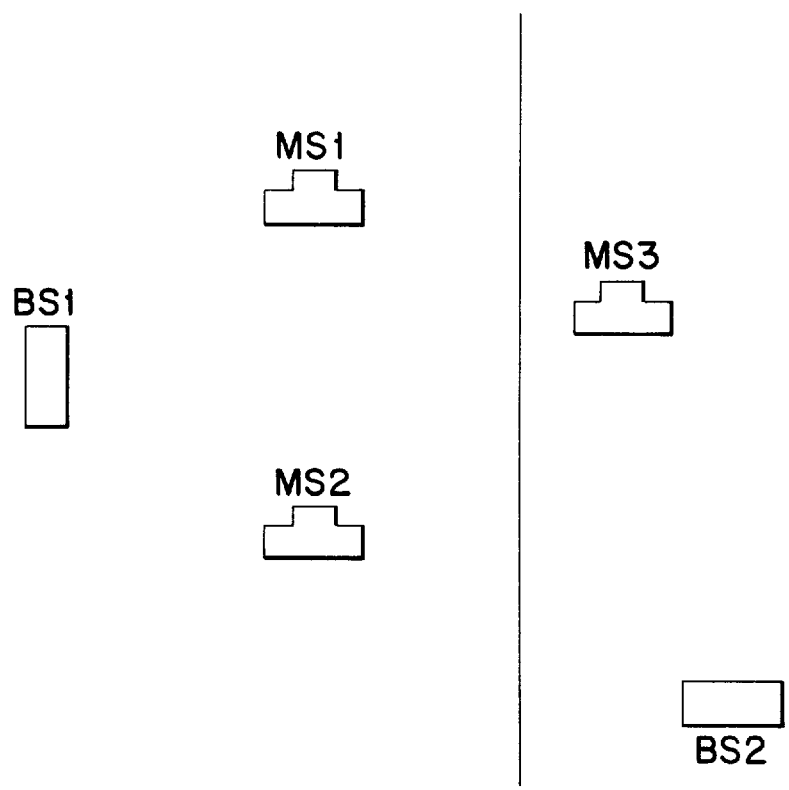

INTRACELL HANDOVER WITH ANTENNA ARRAYS

This application is a continuation of application Ser. No. 08/264,303, filed Jun. 23, 1994, now abandoned.

FIELD OF THE INVENTION

The present invention relates to an intra-cell handover method for use in a cellular communication system and more particularly to an intra-cell handover method which utilizes spatial information from an antenna array.

BACKGROUND OF THE DISCLOSURE

Current digital cellular systems employ base stations which distinguish between different mobile stations by using time and frequency orthogonality. Signals from a mobile station propagate to the base station. The signals are received in a single antenna or sometimes two antennas to gain diversity effects. The receiver processes the signal using the time and frequency orthogonality to separate signals from different users. Handover between channels within a base station, intra-cell handover, is based on quality measurements from the mobile station and the base station. Intra-cell handover is used, for example, to avoid channels with strong interferers. Channel allocation, i.e., the selection of the new channel, is in most cases done according to a frequency plan. Adaptive channel allocation, i.e., assigning a mobile station to a channel based upon measured quality information, has been proposed for evolved TDMA systems and is used in the digital cordless DECT system.

Spatial filters are known in the art and are used to create spatial selectivity, i.e., to reject interference from certain directions and to amplify desired signals from other directions. A spatial filter can be implemented with, for example, a passive circuit with a radio frequency, a set of phase shifters of analog signals or by signal processing in the baseband. The term spatial information is used to denote information about how a spatial filter can process signals. Spatial information can, for example, consist of the spatial filters that in some sense, are optimal to process signals from mobile stations. The spatial information can also consist of the direction-of-arrival of the power from the mobile stations.

It is desirable to improve the spectral efficiency of such systems. One way to improve the spectral efficiency of the system is to use arrays of antennas, e.g., to use a number of spatially separated antenna elements. It is then possible to distinguish between spatially separated users by using narrow adaptive antenna lobes. This can be viewed as a way to utilize orthogonality in spatial dimension.

Current digital cellular systems employ base stations which use antennas with wide antenna lobes of approximately 120 or 360 degrees. The base station receives/transmits signals for all mobile stations within the lobe. It is hence not necessary to know the position of the mobile station. It is, on the other hand, not possible to suppress mobiles transmitting from other angles. There is hence no spatial information to take into account and handover has to be made without spatial information.

A system using an adaptive antenna array can use a narrow antenna lobe to receive/transmit the desired signals and to suppress the undesired signals. This adds a new dimension to the handover strategies since spatial information can be used to fit mobiles into an appropriate channel.

It is necessary to take the spatial disturbance situation into account when allocating channels in order to increase spectral efficiency and to avoid an excessive number of handovers. A mobile should "fit" a channel in the sense that it is not too disturbed by mobiles already present at the channel in own or co-channel cells. At the same time, it is important to choose a channel where the new mobile station will not disturb the mobile station already using the channel. It is also important that the transceiver characteristics for mobiles in their own cell should sometimes be modified as a new mobile is allocated to the channel. The new mobile station could otherwise heavily disturb the other mobile station and cause lost calls or low quality. There is hence new information that must be taken into account in order to perform a correct handover.

In addition, the power levels in the system must also be adjusted so that the base station power levels (receive/transmit) are approximately equal for all mobile stations. A too large power difference will, in practice, destroy the spatial orthogonality and create problems very similar to the "near-far" problem which occurs in CDMA systems.

In systems using an adaptive antenna array, both transmission and reception is adaptive for the array base station which implies that the addition of a new mobile station can modify both transmit and receive antenna patterns for surrounding base stations. Another difference is the fact that multiple users on a channel in a base station using an adaptive array are not automatically orthogonal. The spatial orthogonality is something that must be created with adaptive spatial filtering and with proper channel allocation.

SUMMARY OF THE DISCLOSURE

The present invention discloses an intra-cell handover method which extends known handover algorithms by utilizing spatial information from an antenna array. In addition, the present invention provides a decentralized adaptive channel allocation solution where each base station allocates mobile stations to suitable channels by taking the interference situation into account. Furthermore, the present invention discloses a method for modifying the array transceiver, i.e., a method for linking a mobile station to an already used channel, when a new mobile station is introduced.

The present invention has at least three main advantages over the prior art. First, the capacity of the cellular system is increased since mobile stations are distributed in a proper way amongst the channels. Second, network signalling is minimized since the inventive solution is decentralized for each base station. Finally, all transceivers using a channel are modified directly so as to take the new disturbance situation into account. As a result, the quality for the old mobile stations will not degrade as a new mobile station is introduced.

According to one embodiment of the present invention, a decision on whether an intra-cell handover should be made is based on conventional information and/or a prediction of increased spatial disturbance. If it is determined that the power level deviates too much from a nominal value, an intra-cell handover is performed, wherein the mobile station is handed off to a channel where it does not disturb other connections too much. However, for all channels where the quality is above a predetermined level, a relative uplink disturbance on the new mobile station is computed from measurements. Then, a relative uplink disturbance on the mobile stations that are already present on the channel from the new mobile station are computed using measurements. The downlink disturbance from mobile assisted handoff measurements is then calculated to check the existing downlinks. The best channel is then selected taking conventional intra-cell handover information into account together with the information calculated above. Finally, all transceivers using the selected channel and the old channel are modified according to the new disturbance situation.

DETAILED DESCRIPTION OF THE DRAWINGS

The present invention will now be described in more detail with reference to preferred embodiments of the invention, given only by way of example, and illustrated in the accompanying drawings, in which:

FIG. 3 illustrates channel linking according to one embodiment of the present invention.

DETAILED DESCRIPTION OF THE DISCLOSURE

The present invention discloses an intra-cell handover method which can be divided into three main steps: ICHO-decision; channel allocation; and channel linking. Briefly, the ICHO-decision step determines whether an intra-cell handover is necessary. When a handover is necessary, the channel allocation step determines an appropriate channel for the mobile station. After the mobile has been handed off to the new channel, the transceivers of the mobile stations which are presently using the channel are modified in the channel linking step so as to take the new interference situation into account. The present invention can be combined with, for example, a conventional fixed frequency plan, a slow adaptive channel allocation or random frequency hopping. Each of the individual steps will be described in more detail below.

The present invention describes several ways to enhance capacity. The first way, that is more conventional, is to use the antenna array to reduce the cluster size, i.e., the frequency reuse distance. This implies that there is only one mobile station per channel in a cell and that the interference originates from users in other cells. The second way is to allow multiple users in a channel where the antenna array is used to orthogonalize the users. The interference will then originate both from co-channel mobile stations inside the cell and from other cells. The present invention also covers ICHO in cases where combinations of the techniques are used.

Figure 1:
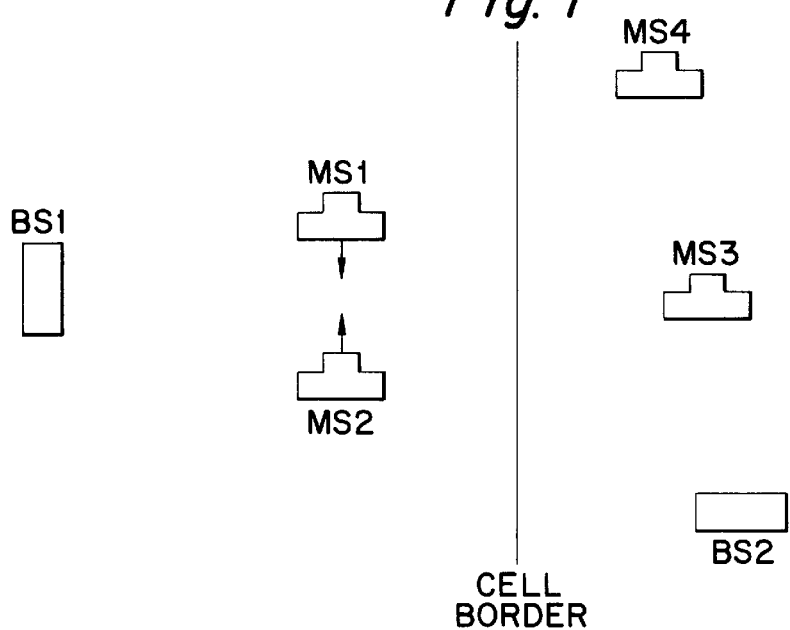
FIG. 1 illustrates a cautious handover decision according to one embodiment of the present invention.

The ICHO-decision can, for example, be made with known techniques based upon scalar quality measurements from the mobile station and the base station. One example of a known technique is described in ETSI/GSM specification 05.08. Additionally, the algorithm can use a cautious strategy where the spatial information is used to predict a deterioration in transmission quality. For example, it is possible to detect that two mobile stations MS1 and MS2 are moving close to each other, as illustrated in FIG. 1. The mobile stations can be connected to the same cell or they might be connected to different cells. This detection is straightforward given the spatial characteristics, i.e., direction-of-arrival, spatial filters, . . . , of the mobile stations. For example, the algorithm can track the angle from where the signal arrives and detect that an angle difference between to mobile stations is too small. As a result, an ICHO-decision can be made to move either of the mobile stations MS1 and MS2 to another channel. An ICHO decision can also be made in order to free a widelobe channel from a user that can be processed on a narrowlobe channel. In GSM-type systems, for example, the BCCH carrier must be distributed over the entire cell in a wide antenna lobe and hence the BCCH carrier is a widelobe channel. A mobile station using the BCCH carrier's traffic slots may then be moved to an ordinary carrier where the downlink may be transmitted in a narrow antenna lobe, hence the notation narrowlobe channel. The ICHO decision may thus reduce the interference level in the system. An ICHO decision may thus imply that the mobile station is linked to a channel together with other mobile stations. The power of the mobile stations presently operating on the channel, i.e., old mobile stations, must not drown the signal from the new mobile stations and it is necessary for the mobile station to regulate its uplink power towards a nominal value. The base station downlink power is analogously set to a nominal value.

The channel allocation, i.e., the choice of a proper new channel, can be made as follows. First, the uplink power level of the mobile station is checked. If the power level of a mobile station deviates by at least a predetermined amount from a nominal value, the mobile station is labeled as "MS with extreme power level" and kept on a widelobe channel for the time being. The channel allocation should also take the stability of the spatial information into account. A mobile station having time variations in the measured spatial information can be kept in a widelobe channel or generally treated with caution in order to reduce interference levels.

The uplink characteristics can be measured by the base station. For each channel the disturbance power that will affect the base station receiver for the new mobile station caused by the existing disturbances on the channel can be measured. This disturbance power is then compared to the power and path loss of the new mobile station to form a signal-interference ratio. This quantity is denoted $\alpha_j$ where j is the number of the channel. The mobile stations connected to other base stations act as uplink disturbances and will thus effect $\alpha_j$.

For each channel, the disturbance power that will affect the base station receivers for the old mobile stations caused by the disturbance from the new mobile station is measured. This disturbance power is compared to the power and path loss of the old mobile stations to form a signal-interference ratio for each old mobile station. This quantity is denoted $\beta_{i,j}$ where j is the number of the channel and i is the number of the mobile.

The downlink characteristics are not measurable at the base station. The algorithm should hence use measurements from the mobile station, such as Mobile Assisted Handover measurements. The disturbance situation is, however, reciprocal in the sense that a channel where uplink transmissions do not interfere in a base station is a channel where downlink transmission from that base station to one mobile station will not disturb the other mobiles significantly. In other words, a base station will see the mobile station it is disturbing as a disturber. This fact is utilized in the channel allocation and linking to optimize performance and quality.

The mobiles will also see other base stations that the first base station cannot take into account. The signals from these other base stations will, on the other hand, usually be weaker than the signal from the first base station. This implies that the parameters $\alpha_j$ and $\beta_{i,j}$ can be used to pick a suitable channel. They should also be combined with conventional channel allocation information such as mobile station interference measurements. The parameters $\alpha_j$ and $\beta_{i,j}$ will be computed below.

Figure 2:
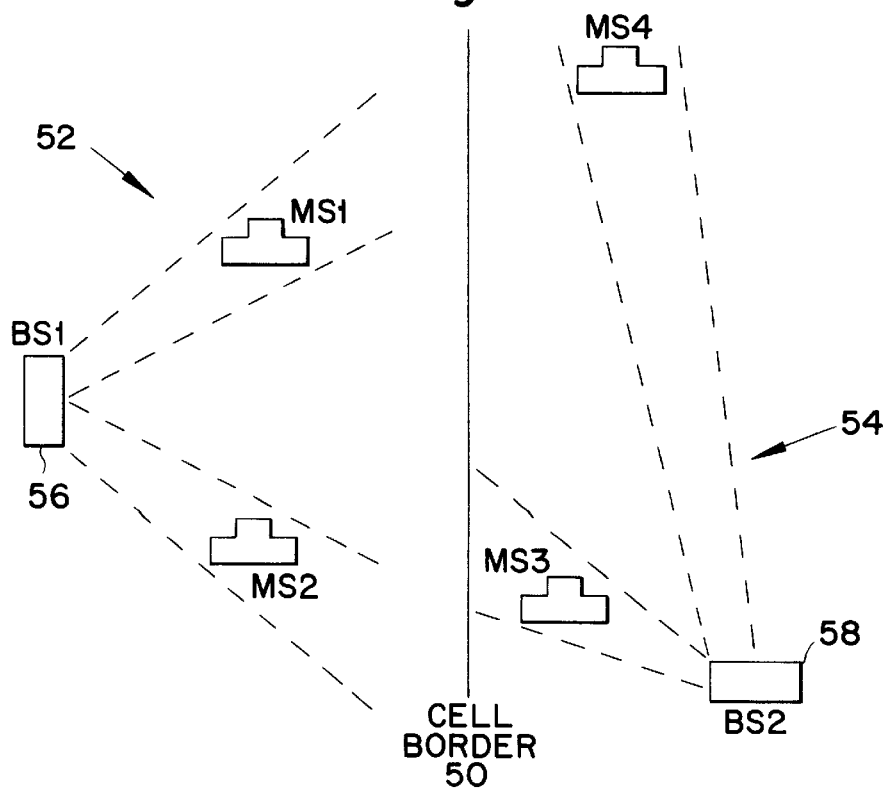
FIG. 2 illustrates channel allocation according to one embodiment of the present invention.

FIG. 2 illustrates an example of channel allocation according to one embodiment of the present invention. In FIG. 2, a cell border 50 separates two cells 52 and 54. Each cell has a base station BS1 and BS2, respectively, which have antenna arrays. In this example, a first mobile station MS1 is serviced by the base station BS1 and can be allocated to an arbitrary channel C1. In addition, a second mobile station MS2 is serviced by the base station BS1 and can be allocated to the same channel C1 since the antenna array can make the mobile stations orthogonal in both the uplink and the downlink. As illustrated, a third mobile station MS3 has the second mobile station MS2 in the same angle sector as viewed from the second base station BS2. As a result, the second base station BS2 will view the second mobile station MS2 as a disturbance in channel C1, and will thus allocate the third mobile station MS3 a different channel, such as C1.

In this example, a fourth mobile station MS4 will act as an uplink disturbance for the first mobile station MS1 in the uplink to the first base station BS1. When the fourth mobile station MS4 performs downlink measurements, the mobile will determine that channel C1 is disturbed by the first base station BS1. The fourth mobile station reports the measurements to the second base station BS2 which will assign the fourth mobile station to a channel other than C1. However, if the fourth mobile station MS4 is not capable of making sufficient MAHO measurements, the second base station can allocate the fourth mobile station to a channel based only on uplink measurements. As a result, the mobile station MS4 could be assigned to channel C1. The first base station BS1 would then detect a new disturber for the first mobile station on channel C1. As a result, the first mobile station MS1 should then be reallocated to another channel by the first base station BS1 if the interference caused by the fourth mobile station is too high.

The present invention can also use a stopping criteria which indicates if a channel is heavily loaded since a mobile station should not be added if any of the users on the channel is too close to a quality limit indicating a possible handoff.

Channel linking, the linking of the new mobile station to the channel can be performed as follows. It is necessary to modify the transceivers for the old mobiles using the selected channel and the transceiver for the new mobile station that is going to be introduced on the selected channel. The spatial filters used in the receivers and transmitters in the array base station are computed with a steering vector containing information about the desired signal and using information about the disturbance situation on the channel. As a new mobile station enters the channel, the disturbance situation is changed and all of the spatial filters must be recalculated to take the new information into account. The transceivers for the mobile stations on the old channel should also be modified as a disturber is removed.

FIG. 3 illustrates an example of channel linking according to one embodiment of the present invention. In this example, the mobile station MS1 is using channel C1 when the mobile station MS2 is allocated to channel C1. The spatial filters in the transceivers for the mobile stations MS1 and MS2 must then be adapted so that they are spatially orthogonal. In other words, the spatial filter for mobile station MS1 should null out the mobile station MS2 and vice versa. The present invention performs this nulling in one instantaneous step without performing measurements. When the mobile station MS3 begins using a channel, the mobile station MS3 will be measured and viewed as a new disturber from the base station BS1. However, the nulling of the mobile station MS3 can be performed based upon spatial interference measurements.

According to one embodiment of the present invention, a simple channel allocation method can be used. In this method, the mobile station can be classified into power classes and used spatial sectors. For example, mobile stations with approximately equal power levels and well separated spatial filters could share the same channel.

According to another embodiment of the present invention, a simple algorithm using fixed filters can be used for channel allocation. In this example, assume that a number of filters with pencil beams have been precomputed and stored. For example, filters $\alpha(\theta_1), \alpha(\theta_2), \ldots \alpha(\theta_{25})$, can be used with pencil beams in the directions $-60°, -55°, \ldots, 60°$. The filter could, for example, be a Hamming window multiplied with the array steering vector for the desired direction. Each filter is referred to by the direction of its pencil beam, its direction-of-arrival (DOA).

A suitable channel can be found as follows. A DOA is considered as used by the mobile station if the DOA itself or one of its two closest neighbors has been successfully used during the last ten bursts. All channels where the quality is good enough are scanned to find a channel where the DOA used by the new mobile station are neither disturbed by mobile stations in other cells or used by mobile stations in own cells. Typically, a DOA is judged as disturbed if the output power from the filter is above a fraction of the nominal power level. The DOA's for the chosen channel are then occupied by the new mobile station and link the mobile station to the channel. The spatial transceiver for the new mobile station is simply the set of filters it is using. Thus, there is thus no need to modify the transceivers of the old mobile station on the channel.

According to one embodiment of the present invention, an advanced algorithm for channel allocation can be used. The mobile to be reallocated can be characterized by a spatial filter matrix W, a covariance matrix R and a power P. The J accessible channels are characterized by their spatial filter matrices, $W_{i,j} i=1, \ldots, M_j$ where $M_j$ is the number of mobiles on channel j, by their covariance matrices, $R_j$, and by the power of the mobiles $P_{i,j}$.

The expected power of the disturbance on the new mobile station relative its useful power is $$\alpha_j \stackrel{def}{=} \frac{\text{trace}[W^H R_j W]}{P}$$

The expected disturbance power on the old mobile number i using channel j from the new mobile is $$\beta_{i,j} \stackrel{def}{=} \frac{\text{trace}[W_{i,j}^H R W_{i,j}]}{P_{i,j}}$$

One choice is then to pick the channel $J_o$ where $$J_o = \arg\min_j \left\{ \alpha_j + \sum_{i=1}^{M_j} \beta{i,j} \right\}$$

Another solution is to measure the maximum disturbance that will affect any of the old mobiles and let $$J_o = \arg\min_j \left\{ \alpha_j + \max_i \beta{ij} \right\}$$

Conventional scalar information should also be used. For example, a heavily disturbed channel should not be further loaded according to the previously mentioned stopping criteria.

According to one embodiment of the present invention, an advanced algorithm for channel linking can be used. This example shows how the spatial filters for the mobiles presently using channel $J_o$ and for the new mobile can be modified. The spatial filter matrices for the M mobiles using the channel are denoted $W_1, \ldots, W_M$ and the new mobile is denoted $W_{M+1}$. First, the average cross-correlation for the existing mobiles is computed wherein for notational simplicity the correlation matrix of channel $J_o$ is denoted $R_{old}$.

$$\hat{R}_{xd}(i) = \hat{R}_{old} W_i\ i=1, \ldots, M$$

The average cross-correlation for the new mobile, with the associated correlation matrix denoted R, is $$\hat{R}_{xd}(M+1) = \hat{R} W_{M+1}$$

The correlation matrix for the channel after the addition of the new mobile can be approximated as $$\hat{R}_{new} = \hat{R}_{old} + \hat{R}$$

It is then possible to compute new spatial filters as $$W_i = \hat{R}_{new}^{-1} \hat{R}_{xd}(i)\ i=1, \ldots, M+1$$

The foregoing treatment has assumed a unique $R_j$ per channel but it is straightforward to incorporate a dependence upon sampling phase.

While a particular embodiment of the present invention has been described and illustrated, it should be understood that the present invention is not limited thereto since modifications may be made by persons skilled in the art. The present application contemplates any and all modifications that fall within the spirit and scope of the underlying invention disclosed and claimed herein.

I claim:

1. An intra-cell handover method in a cellular communication system having adaptive antenna arrays, comprising the steps of:
   measuring spatial information inside a sector with an antenna array;
   determining whether an intra-cell handover is desirable for a mobile station based upon said measured spatial information;
   handing over said mobile station from a first channel to a second channel within the same sector when desirable; and
   computing spatial filters in transceivers for said mobile station and other mobile stations operating on the first and second channels based on the measured spatial information.

2. An intra-cell handover method according to claim 1, wherein the measured spatial information is used to predict an interference situation that would result from various channel allocation decisions.

3. An intra-cell handover method according to claim 2, further comprising the steps of:
   measuring power level of said mobile station; and
   assigning said mobile station a channel based upon the measured power level and measured spatial information.

4. An intra-cell handover method according to claim 2, further comprising the step of:
   computing the relative uplink interference on the mobile station.

5. An intra-cell handover method according to claim 4, further comprising the step of:
   computing the relative uplink interference on the mobile station caused by said mobile station.

6. An intra-cell handover method according to claim 2, further comprising the step of:
   computing the downlink disturbance to check existing downlinks.

7. An intra-cell handover method according to claim 6, further comprising the step of:
   computing the downlink disturbance to check existing downlinks.

8. An intra-cell handover method according to claim 2, wherein said second channel is selected using said computed information.

9. An intra-cell handover method in a cellular communication system having adaptive antenna arrays, comprising the steps of:
   measuring spatial information inside a sector with an antenna array;
   determining whether an intra-cell handover is desirable for a mobile station based upon said measured spatial information;
   handing over said mobile station from a first channel to a second channel within the same sector when desirable; and
   computing spatial filters in transceivers for mobile stations using the first channel based on the measured spatial information.

10. An intra-cell handover method according to claim 9, wherein the measured spatial information is used to predict an interference situation that would result from various channel allocation decisions.

11. An intra-cell handover method according to claim 10, further comprising the steps of:
   measuring power level of said mobile station; and
   assigning said mobile station a channel based upon the measured power level and measured spatial information.

12. An intra-cell handover method according to claim 10, further comprising the step of:
   computing the relative uplink interference on other mobile station.

13. An intra-cell handover method according to claim 12, further comprising the step of:
   computing the relative uplink interference on other mobile stations caused by said mobile station.

14. An intra-cell handover method according to claim 13, further comprising the step of:
   computing the downlink disturbance to check existing downlinks.

15. An intra-cell handover method according to claim 10, further comprising the step of:
   computing the downlink disturbance to check existing downlinks.

16. An intra-cell handover method according to claim 10, wherein said second channel is selected using said computed information.

17. An intra-cell handover method in a cellular communication system having adaptive antenna arrays, comprising the steps of:
   determining whether an intra-cell handover is necessary;
   measuring the power level of a mobile station which needs to be handed off;

assigning said mobile station to a channel based upon said measured power level;

computing the relative uplink disturbance on the mobile station;

computing the relative uplink disturbance on other mobiles from said mobile station;

computing the downlink disturbance to check existing downlinks;

selecting a best channel using said computed information; and modifying spatial filters of all transceivers using the selected channel and the old channel according to new disturbance situation.

18. An intra-cell handover method according to claim 17, wherein said downlink disturbance is computed using measurements from said mobile station.

19. An intra-cell handover method according to claim 17, wherein scalar quality measurements are used when determining whether the handover is necessary.

20. An intra-cell handover method according to claim 17, wherein a handover is performed when two mobile stations using the same channel move too close to each other.

21. An intra-cell handover method according to claim 17, wherein said uplink disturbance is measured at a base station.

* * * * *